(12) United States Patent
Marsaud et al.

(10) Patent No.: US 6,322,649 B1
(45) Date of Patent: Nov. 27, 2001

(54) PROCESS FOR PROVIDING GRADUAL DEPLOYMENT OF AN AIRBAG AND A PYROTECHNIC CHARGE FOR ITS IMPLEMENTATION

(75) Inventors: Benoît Marsaud, Neaufles Saint Martin; Christian Perotto, Ballancourt; Jean-Charles Delwarde, Itteville; Daniel Duvacquier, Bordeaux, all of (FR)

(73) Assignee: Livbag SNC, Vert le Petit (FR)

( * ) Notice: Subject to any disclaimer, the term of this patent is extended or adjusted under 35 U.S.C. 154(b) by 0 days.

(21) Appl. No.: 09/652,019

(22) Filed: Aug. 31, 2000

Related U.S. Application Data

(62) Division of application No. 09/058,212, filed on Apr. 10, 1998, now Pat. No. 6,129,023.

(30) Foreign Application Priority Data

Apr. 11, 1997 (FR) .................................................. 97-04464

(51) Int. Cl.$^7$ ............................ C06B 45/28; C06B 45/12
(52) U.S. Cl. ........................... 149/10; 149/97; 102/288; 102/289
(58) Field of Search .................................. ; C06B 45/28, C06B 45/12

(56) References Cited

U.S. PATENT DOCUMENTS

| | | | |
|---|---|---|---|
| 3,957,548 | * 5/1976 | Rohr et al. | 149/98 X |
| 3,963,545 | 6/1976 | Thomas et al. | 149/100 X |
| 4,023,996 | 5/1977 | Leneveu | 149/100 |
| 4,106,960 | * 8/1978 | Brachert et al. | 149/98 X |
| 4,246,051 | 1/1981 | Gamer et al. | 149/7 |
| 4,284,592 | * 8/1981 | Evans et al. | 149/98 X |
| 4,300,961 | * 11/1981 | Williams | 149/98 X |
| 4,389,263 | * 6/1983 | Allen | 149/98 X |
| 4,601,767 | * 7/1986 | Youngstrand | 149/98 X |
| 4,886,560 | 12/1989 | Cartwright | 149/12 |
| 5,139,280 | 8/1992 | Cord et al. | 280/741 |
| 5,160,163 | 11/1992 | Castagner et al. | 280/740 |
| 5,174,837 | 12/1992 | Boileau et al. | 149/12 X |
| 5,351,619 | * 10/1994 | Chan et al. | 102/289 |
| 5,507,890 | 4/1996 | Swann et al. | 149/16 |
| 5,524,544 | * 6/1996 | O'Meara et al. | 102/289 X |
| 5,529,335 | 6/1996 | Bohmler | 280/741 |
| 5,610,444 | 3/1997 | Austruy et al. | 264/3.3 |
| 5,750,922 | 5/1998 | Seeger | 102/289 X |
| 6,053,108 | 4/2000 | Ranerowski | 149/96 X |
| 6,129,023 | * 10/2000 | Marsaud et al. | 102/289 X |

FOREIGN PATENT DOCUMENTS

| | | |
|---|---|---|
| 39 33 555 C1 | 10/1989 | (DE) . |
| 0 586 045 A2 | 3/1994 | (EP) . |
| 0 586 060 A2 | 3/1994 | (EP) . |
| 0 591 119 A2 | 4/1994 | (EP) . |
| 0 767 155 A1 | 4/1997 | (EP) . |
| 2 750 422 | 6/1996 | (FR) . |

\* cited by examiner

Primary Examiner—Peter A. Nelson
(74) Attorney, Agent, or Firm—Pillsbury Winthrop LLP

(57) ABSTRACT

The invention relates to the field of protecting the occupants of a motor vehicle by an inflatable airbag. The invention relates to a process consisting in inflating an airbag (1) by a pyrotechnic generator (2) containing a double-composition charge (9) formed around a main charge having a linear burning rate $V_1$ and at least part of the ignition faces of which are covered with a skin of moderate pyrotechnic composition having a linear burning rate $V_2$ satisfying the relationship:

$$0.05\ V_1 \leq V_2 \leq 0.5\ V_1.$$

The invention thus makes it possible to inflate the airbag gradually during the first milliseconds of deployment of the latter.

1 Claim, 2 Drawing Sheets

PROCESS FOR PROVIDING GRADUAL DEPLOYMENT OF AN AIRBAG AND A PYROTECHNIC CHARGE FOR ITS IMPLEMENTATION

This Appln is a Div. of Ser. No. 09/058,212 filed Apr. 10, 1998, U.S. Pat. No. 6,129,023.

The present invention relates to the field of protection, in the event of an impact, of the occupants of a motor vehicle by means of an airbag inflated by a pyrotechnic gas generator. More specifically, the invention relates to a process for ensuring gradual deployment of the airbag. The invention also relates to a pyrotechnic charge allowing implementation of the process according to the invention.

It is known, in the event of a collision of a motor vehicle, to protect the occupants of this vehicle by means of airbags which are inflated by the gases arising from a pyrotechnic generator. The gases serving to inflate the airbag may come entirely from the combustion of a pyrotechnic charge or result from mixing the gases arising from the combustion of a pyrotechnic charge with gases stored in a pressurized chamber, as is the case for so-called "hybrid" gas generators. As pyrotechnic gas-generating compositions, those skilled in the art may use inorganic compositions based on sodium azide such as those described, for example, in French Patent FR-B-2,649,478 or in its corresponding American Patent U.S. Pat. No. 5,139,280. Those skilled in the art may also use compositions similar to the propellent powders for weapons, having a single base comprising nitrocellulose or two bases comprising nitrocellulose and nitroglycerine, or else so-called "composite" powders based on an organic binder and an oxidizing charge, as described, for example in French Patent FR-B-262,322 or in its corresponding American Patent U.S. Pat. No. 5,160,163.

Airbags for protecting the occupants of a motor vehicle must be able to be deployed in an extremely short time, of the order of 30 to 40 ms, and require, in order to do this, the use of pyrotechnic charges having very high burning rates. However, the use of such charges poses a new problem since too sudden a deployment of the airbag in the first milliseconds of operation may cause serious injuries to the vehicle's occupant who the airbag is supposed to protect. It is therefore necessary to use a charge having an overall burning rate compatible with the requirements of motor-vehicle safety but having a gradual combustion law. Those skilled in the art say that, on firing in a closed chamber, the curve representing the pressure in the chamber as a function of time has, for such a charge, a general S-shaped appearance.

This type of consideration departs completely from the use of pyrotechnic charges completely or partially covered with an ignition enhancer coating. These charges, which are described, for example, in U.S. Pat. No. 4,246,051, have an initial pressure development which is incompatible with the desired gradual behaviour.

In order to obtain gradual deployment of the airbag, those skilled in the art have explored several types of solution.

Those skilled in the art have sought to manufacture charges comprising several layers having different thicknesses and different burning rates. U.S. Pat. No. 5,507,890 thus describes such sodium-azide-based charges produced by pressing. Nevertheless, the technique thus described is limited in its possibilities of application to compositions based on sodium azide, which compositions are, moreover, increasingly forsaken because of the toxicity and safety problems associated with compositions of this type.

Those skilled in the art have also sought to obtain gradual charges by coating charges based on compositions having a high burning rate with an inhibiting skin based on a resin or on inert inorganic substances, as described, for example, in Patent Applications EP-A-0,586,045 and EP-A-0,586,060. However, these solutions are not satisfactory from the standpoint of the non-toxicity and cleanness of the gases thus generated.

Those skilled in the art have therefore sought to obtain a gradual emission of gases by using generators having multiple coaxial combustion chambers, each containing a different pyrotechnic charge. This solution, described for example in U.S. Pat. No. 5,529,335 which relates more particularly to a generator for a seat-belt retractor, involves a complex structure of the generator and therefore a high cost of the latter.

Those skilled in the art do not currently have available a simple and economical solution for providing gradual inflation, under the time conditions imposed by motor-vehicle safety requirements, of an airbag.

The object of the present invention is specifically to provide a solution to this problem.

The invention therefore relates to a process allowing an airbag for protecting an occupant of a motor vehicle to be inflated in a gradual manner by means of a device consisting mainly of the said airbag connected to a pyrotechnic generator of gases arising at least partially from the combustion of a solid pyrotechnic charge placed inside the said generator, the combustion of which charge may be initiated by an igniter coupled to a collision detector, characterized in that:

i) a solid pyrotechnic double-composition charge is used which consists of a main pyrotechnic charge having a linear burning rate $V_1$ at least equal to 25 mm/s under a pressure of 20 MPa and the surface of which is at least partially covered with an external skin of pyrotechnic composition adhering to the said main charge by simple deposition and having a linear burning rate $V_2$ which satisfies the relationship:

$$0.05\ V_1 \leq V_2 \leq 0.5\ V_1;$$

ii) the said double-composition charge is placed inside the said generator so that the entire surface of the main charge thus covered serves as the combustion initiation surface of the latter when the said igniter is actuated by the collision detector.

The process according to the invention thus relates both to protection devices in which all of the gases serving to inflate the airbag arise from the combustion of a solid pyrotechnic charge and to those in which the gases which serve to inflate the airbag arise only partly from the combustion of a solid pyrotechnic charge, the other part coming either from a pressurized gas container, as is the case for so-called "hybrid" generators, or even from the outside, as is the case for siphon systems.

According to a first essential characteristic of the invention, a solid pyrotechnic double-composition charge is used which consists of a main gas-generating pyrotechnic charge having a linear burning rate $V_1$ at least equal to 25 mm/s and preferably close to 40 mm/s under an operating pressure of 20 MPa in order to be able to meet the motor-vehicle safety requirements. This main charge may be in the form of discs, but advantageously it will be in the form of an annular axisymmetric block having at least one central channel allowing it to be positioned around the igniter. This block will also preferably comprise at least one peripheral channel and, in general, a plurality of peripheral channels.

The surface of this main charge must be at least partially covered with an external skin of a pyrotechnic gas-generating composition whose burning rate will be less than the burning rate of the main charge but which will not be zero. The inhibiting compositions, which degrade with heat but which do not have a proper burning rate, are therefore expressly excluded from the field of the present invention. In practice, a pyrotechnic composition will be chosen, in order to form this skin, which has a linear burning rate $V_2$ which satisfies, under the same pressure conditions, the relationship:

$$0.05\ V_1 \leq V_2 \leq 0.5\ V_1$$

and preferably:

$$0.1\ V_1 \leq V_2 \leq 0.5\ V_1.$$

This external skin of pyrotechnic composition must adhere perfectly to the main charge without any pyrotechnic discontinuity and especially without the use of adhesive. This skin must therefore adhere to the main charge by simple deposition. For this reason, the external skin and the main charge will usually be of the same nature.

According to a first embodiment of the invention, nitrocellulose-based pyrotechnic compositions will be is used to constitute the said main pyrotechnic charge and the said external skin. This is because these compositions lend themselves well to the preparation of lacquers which can be deposited by dip-coating or spraying as thin layers on the main charge in order to constitute, after evaporation of the solvent, a skin which adheres perfectly to the said main charge. Advantageously, it will be possible to incorporate powerful and non-powerful plasticizers into the said lacquer. One particularly preferred solution in this context consists in using a main pyrotechnic charge consisting of double-base powder comprising nitro-cellulose and nitroglycerine, this main charge being covered with a skin of single-base powder comprising nitrocellulose. However, for reasons of stability over time, according to a preferred second embodiment of the invention, composite pyrotechnic compositions mainly consisting of a binder and a powerful charge, such as the compositions known by the name "LOVA" for example, will be used to constitute the said main external charge and the said external skin.

Depending on the type of binder, it will be possible to deposit on the main charge, by dip-coating or spraying, the composition layer intended to constitute the external skin either in the form of a solution in a volatile solvent or in the form of a composite paste whose binder is not polymerized, its polymerization taking place after deposition on the main charge. In order to improve the adhesion of the pyrotechnic skin to the main charge, composite compositions containing the same binder will advantageously be used to constitute the said main charge and the said pyrotechnic skin.

As particularly preferred pyrotechnic compositions in the context of the present invention, the compositions described in French Patent FR-A-2,728,562 or in its corresponding American Patent U.S. Pat. No. 5,610,444, or else those described in French Patent Application 96,08050, may be mentioned.

According to a preferred embodiment of the invention, a main pyrotechnic charge will be used in the form of an annular block, only the external lateral surface of which is covered with a pyrotechnic skin of burning rate $V_2$.

According to a second characteristic of the invention, the said double-composition charge is placed inside the said generator so that at least the entire surface of the main charge thus covered serves as the combustion initiation surface of the latter when the said igniter is actuated. It is in fact essential, in the context of the invention, that the external skin of slow pyrotechnic composition contribute entirely to the combustion initiation of the charge and, to achieve this, it is essential that this entire skin be able to be reached by the hot gases arising from the igniter. This means, in particular when the double-composition charge is in the form of an annular block, that this block must have dimensions smaller than those of the combustion chamber of the generator and that it must be wedged, inside this chamber, by wedging means permeable to the ignition gases. To do this, a pyrotechnic generator will advantageously be used which consists of a hollow cylindrical body in the form of a can, comprising a side wall and a plane face and closed by a closure ring through which a central ignition device passes, this ignition device entering the said can and being surrounded by a pyrotechnic charge in the form of an annular block held in place by wedging systems permeable to the gases, such as meshes and springs for example, the side wall of the said generator moreover having gas outlet orifices which are blocked off, before operation, by a thin metal shell of copper internal to the said generator.

If the main charge includes regions not covered by the said pyrotechnic skin, these regions will be able, depending on the case, to contribute or not to the combustion initiation of the pyrotechnic charge.

The invention also relates to the pyrotechnic double-composition charges allowing implementation of the process which has just been described. These charges consist of an encapsulated main charge having a linear burning rate at least equal to 25 mm/s under a pressure of 20 MPa and are characterized in that at least part of the surface of the said main charge is covered with a skin of pyrotechnic composition adhering to the said main charge by simple deposition and having a linear burning rate $V_2$ which satisfies, under a pressure of 20 MPa, the relationship:

$$0.05\ V_1 \leq V_2 \leq 0.5\ V_1.$$

As already mentioned above, the linear burning rate $V_2$ will preferably satisfy the relationship:

$$0.1\ V_1 \leq V_2 \leq 0.5\ V_1.$$

This skin may cover the entire surface of the main charge, including the surface of the channels in the case of a multiperforated annular block or only a part, for example only the external surface in the case of a main charge in the form of an annular block. As will now be explained in detail, the combustion of this skin must correspond to the entire first milliseconds of combustion of the complete twin-composition charge. This skin will therefore contain little pyrotechnic material and its thickness will be very small, usually less than or equal to 0.1 mm and preferably of the order of a few hundreds of a millimetre. In practice, it will be sought to set the thickness of this skin so that its combustion time is at most equal to one-quarter of the combustion time of the main charge.

Thus, in the event of a collision of the vehicle, the collision detector sends an electrical signal to the igniter which is fired and sends hot gases over at least the entire surface of the twin-composition charge covered with the skin of pyrotechnic composition with a slower burning rate. This produces a moderate evolution of gas which initiates the deployment of the airbag. Since the thickness of this skin is very small, as indicated above, after a few milliseconds the skin has completed its own combustion and has transmitted the burning material to the surfaces of the main charge which have not yet been initiated. The combustion then continues over the entire surface of the main charge at a high rate and a high gas flow rate, which continues and completes the deployment of the airbag in the time required for motor-vehicle safety. The invention thus offers those skilled in the art the possibility of gradually deploying the airbag using conventional generators and without appreciably increasing the manufacturing costs, the production of a twin-composition pyrotechnic charge by dip-coating or spraying being easily automatable.

One example of implementation of the invention, according to a preferred embodiment, is described below with reference to FIGS. 1 to 4.

Figure 1:
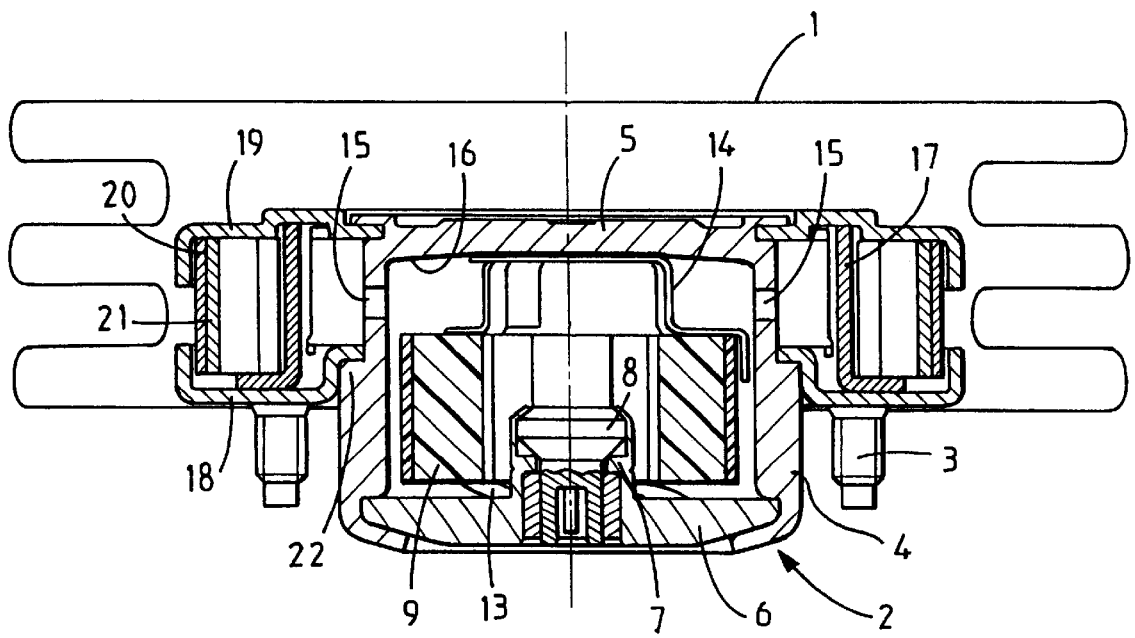
FIG. 1 shows, in a partial sectional view, a device allowing the process according to the invention to be implemented.

FIG. 1 shows a device for protecting an occupant of a motor vehicle, consiting of an inflatable airbag 1 fixed to a pyrotechnic gas generator 2 by screws 3 which also serve to fix the device to the vehicle.

The generator 2 consists of a hollow cylindrical body in the form of a can comprising a side wall 4 and a plane wall 5 made as a single piece. This can is closed by a closure ring 6 crimped in the free end of the can constituting the body of the generator. The closure ring 6 has a central orifice flanged with a neck 7 entering the generator 2. An electrical igniter 8 is crimped in the neck and is coupled by an electrical connection to a collision detector, not shown in the figure. A pyrotechnic charge 9 in the form of an annular block is placed inside the generator around the igniter 8.

Figure 2:
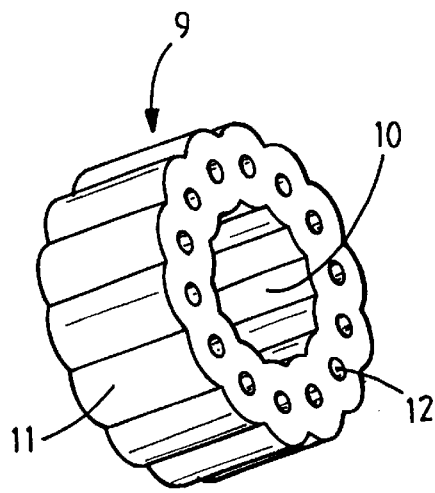
FIG. 2 shows, seen in perspective, a twin-composition charge used in the context of the invention.

Referring more particularly to FIG. 2, it may be seen that this annular block has the shape of a lobate ring having a central large-diameter channel 10, each lobe 11 having a small-diameter channel 12. The dimensions of the charge 9 are less than those of the internal volume of the generator 2, the charge being held in place by assemblies 13 and 14 which are permeable to the gases arising from the igniter 8.

The side wall 4 of the body of the generator 2 has gas outlet orifices 15 arranged near the plane wall 5. These orifices 15 are capped by a very thin copper internal can 16, the free end of which is pinched between the closure ring 6 and the side wall 4.

These orifices 15 are arranged opposite a perforated deflector 17 carried and held in place by an external annular ring 18 and by an annular diffuser 19. The external annular ring 18 rests on an external flat 22 on the side wall 4, while the diffuser 19 is crimped in the rim of the plane wall 5. Filtering meshes 20 and 21 also wedged in between the external ring 18 and the diffuser 19 complete the gas outlet device which is inside the inflatable airbag 1.

Figure 3:
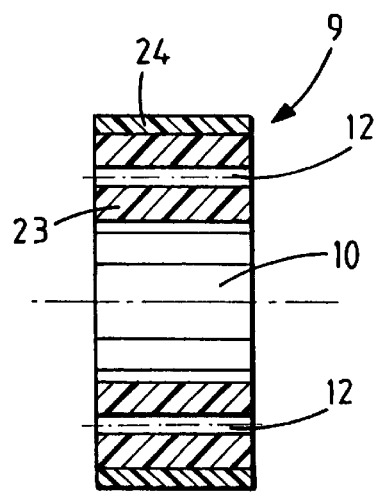
FIG. 3 shows, seen in cross-section in a plane of axial symmetry, the charge shown in FIG. 2.

Referring now more particularly to FIG. 3, it may be seen that the pyrotechnic charge 9 is composed of a main charge 23 having the geometry described above and the external lateral surface of which main charge is covered with an external skin 24 whose thickness has been exaggerated for the sake of clarity in FIG. 3, as is also the case in FIG. 1.

The main charge 23 is a composite charge essentially consisting of a silicone binder and an oxidizing charge which is an ammonium perchlorate/sodium nitrate mixture, according to the technique described in Patent FR 2,728, 562. The oxidizing-charge content in this main charge 23 was 80 parts by weight. The external skin 24 consists of a pyrotechnic composition of the same nature, in which the oxidizing-charge content was 40 parts by weight only. This skin 24 was deposited on the main charge 23 by spraying before complete crosslinking of the silicone binder. The thickness of the skin 24 was less than 0.1 mm (one-tenth of a mm) and its linear burning rate $V_2$ at 20 MPa was of the order of 4 mm/s for a linear burning rate $V_1$ at 20 MPa of 40 mm/s for the main charge 23.

The operation of this generator is as follows. In the event of an accident, the collision detector, not shown in the figures, sends an electrical signal which fires the igniter 8 which sends hot gases in order to initiate the combustion of the charge 9 over all of its accessible surfaces. It should be pointed out that the plane surfaces of this charge, as well as the internal surfaces of the central channel 10 and of the peripheral channels 12 burn immediately at the high rate $V_1$, while the side surface of the charge 9 starts to burn at the moderate rate $V_2$ so as to burn at the high rate $V_1$ only when the thickness of the skin 24 has been burned.

When the pressure inside the generator reaches a predetermined sufficient value, the caps consisting of the parts of the can 16 which lie opposite the orifices 15 burst and the combustion gases, distributed by the perforated deflector 17, pass through the filtering meshes 20 and 21 before inflating the airbag 1. It should be pointed out that, in the context of the present invention, the caps must burst before the skin 24 has finished burning.

Surprisingly, it has been observed that the use of a thin copper internal can 16 makes it possible to obtain cleaner and less toxic gases than those obtained with a conventional thin aluminium internal can.

Figure 4:
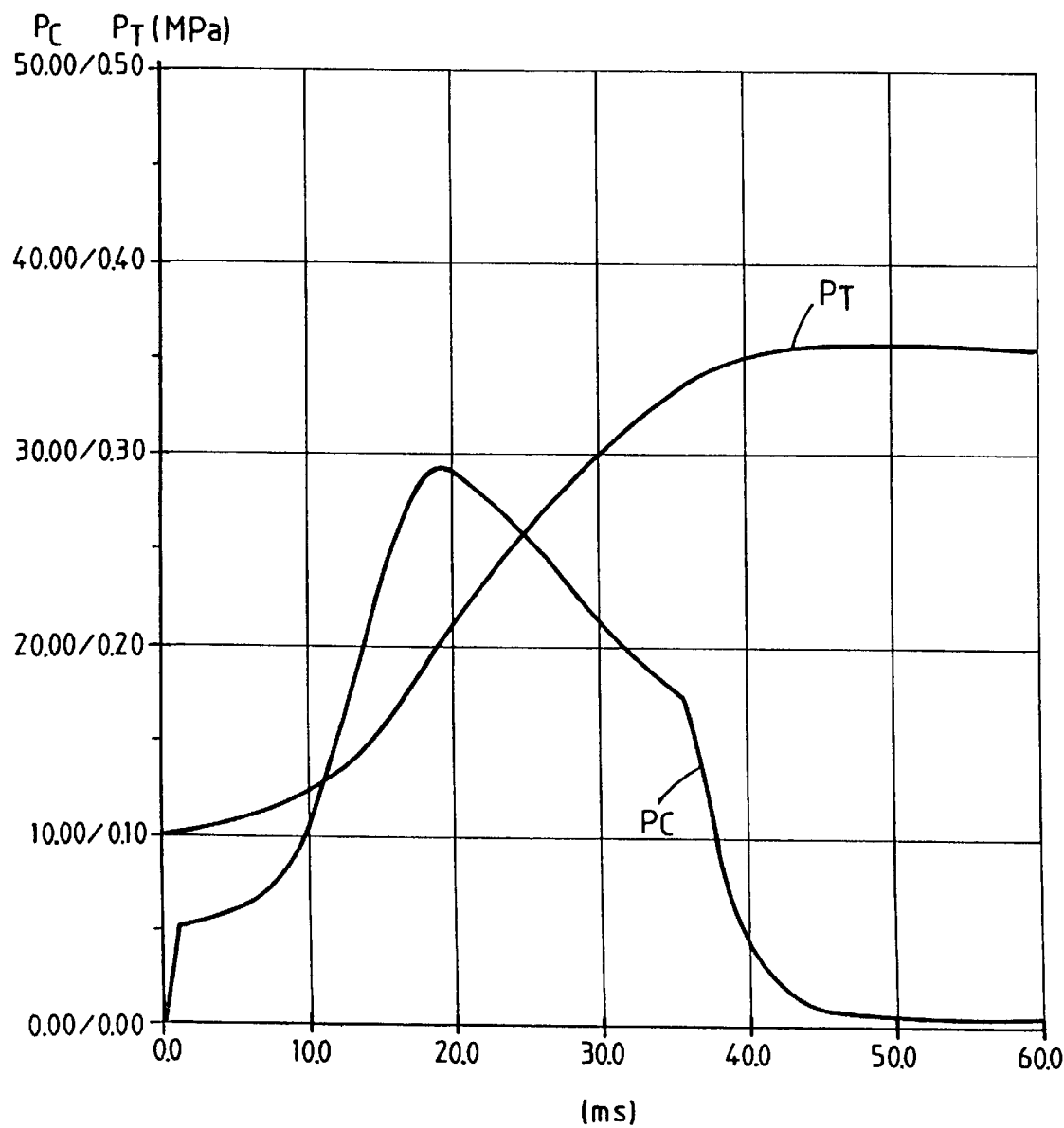
FIG. 4 shows pressure curves for a device according to the invention in operation.

By way of example, a pyrotechnic generator identical to the one just described was operated in a 60-liter sealed chamber, representing the volume offered by an airbag. The pressure $P_C$ inside the generator, on the one hand, and the pressure $P_T$ in the sealed chamber, on the other hand, were measured using pressure sensors. FIG. 4 shows the curves $P_C$ and $P_T$ thus obtained, as a function of time. Curve $P_T$ clearly illustrates the gradual nature of the pressure rise in the sealed chamber.

What is claimed is:

1. A pyrotechnic double-composition charge comprising an encapsulated main pyrotechnic charge (23) having a linear burning rate $V_1$ at least equal to 25 mm/s under a pressure of 20 Mpa and at least part of the surface of said main charge being covered with an external skin (24) of pyrotechnic composition adhering to the said main charge by simple deposition, said skin having a thickness of less than, or equal to, 0.1 mm and having a linear burning rate $V_2$ which satisfies, under a pressure of 20 Mpa, the relationship $0.05\ V_1 \leq V_2 \leq 0.5\ V_1$.

* * * * *